(12) United States Patent
Mildner et al.

(10) Patent No.: US 7,984,944 B2
(45) Date of Patent: Jul. 26, 2011

(54) FENDER FOR A MOTOR VEHICLE

(75) Inventors: Udo Mildner, Limburg (DE); Sven Lösch, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 12/427,496

(22) Filed: Apr. 21, 2009

(65) Prior Publication Data
US 2009/0284046 A1    Nov. 19, 2009

(30) Foreign Application Priority Data
Apr. 22, 2008   (DE) .................. 10 2008 020 092

(51) Int. Cl.
*B62D 25/00*      (2006.01)
(52) U.S. Cl. ........................................ 296/198
(58) Field of Classification Search .................. 296/154, 296/198, 208, 213
See application file for complete search history.

(56) References Cited

U.S. PATENT DOCUMENTS
| | | | | |
|---|---|---|---|---|
| 4,728,145 A * | 3/1988 | Benedetto | ...... | 296/208 |
| 4,968,083 A * | 11/1990 | Tomforde | ...... | 296/208 |
| 5,533,779 A * | 7/1996 | Epple et al. | ...... | 296/208 |

FOREIGN PATENT DOCUMENTS
| | | |
|---|---|---|
| DE | 3724193 A1 | 3/1988 |
| DE | 10160676 A1 | 6/2003 |

* cited by examiner

*Primary Examiner* — Lori L Lyjak
(74) *Attorney, Agent, or Firm* — Ingrassia Fisher & Lorenz, P.C.

(57) ABSTRACT

A fender for a motor vehicle is provided that includes, but is not limited to a headlight aperture and a mounting flange for the support on a bodywork of the motor vehicle. The mounting flange and a flange for the connection of a bumper are connected to one another with a bracket. The bracket is mounted to the bodywork.

9 Claims, 3 Drawing Sheets

FENDER FOR A MOTOR VEHICLE

CROSS-REFERENCE TO RELATED APPLICATION

This application claims priority to German Patent Application No. 102008020092.1, filed Apr. 22, 2008, which is incorporated herein by reference in its entirety.

TECHNICAL FIELD

The invention relates to a fender for a motor vehicle with a water channel, which is arranged between a head lamp aperture and a connection of an A-pillar, for connecting to a bodywork of a motor vehicle, and with a front flange for the connection of a front bumper pointing in the driving direction, and with at least one further flange for connecting to the bodywork.

BACKGROUND

In case of fenders of today's motor vehicles, the headlight aperture is directly adjacent to a front hood. Thus, the vertical support of the fender at adjacent areas of the bodywork of the motor vehicle is limited by the distance of the head light from the front hood. For today's motor vehicles, however, in particular if designed as a van, the windshield comes close to the headlights. At the same time, for design reasons, the headlights have an elongated shape directed towards the windshield. This results in a very short water channel and hence in a low strength of the support of the fender in vertical direction. Furthermore, the elongated shape of the headlight results in an unstable joint area at the fender. In the worst case, thereby, the fender can be deformed close to the headlight with low pressure.

From experience, it is thus known to arrange pins at the headlight and to arrange recesses corresponding to the pins at the opposing edge of the fender. Thereby, the joint between the headlight and the fender can be stabilized. However, this has the disadvantage that the edge of the fender can be bent during the assembly of the headlight since the sight to the edge during the assembly of the headlight is partially covered. Moreover, the pins can be damaged during minor crashes of the motor vehicle, whereby at the same time, the headlight is unusable.

In view of the foregoing, a fender design is sought to address the problems of the aforementioned type in such a manner to provide a high stability and simple assembly. Other desirable features and characteristics will become apparent from the subsequent summary and detailed description, and the appended claims, taken in conjunction with the accompanying drawings and this background.

SUMMARY

The foregoing problem, and other problems, is solved according to an embodiment of the invention in that, in the headlight aperture, a mounting flange for the connection to the bodywork of the motor vehicle is arranged.

By means of this configuration, the fender according to an embodiment of the invention has an additional support at the bodywork in the area of the headlight. This results in an increase of the stability of the fender in the area of the headlight. Furthermore, the mounting flange contributes to the increase of the buckling strength in the area of the headlight. In addition, the mounting flange simplifies the positioning of the headlight aperture and hence, of the fender with respect to the headlight to be assembled subsequently. Thereby, the fender can be assembled in a particularly simple manner.

A simple support of the mounting lug arranged within the headlight aperture can be created a simple manner according to an advantageous development in when a bracket connects the mounting flange within the headlight aperture with the front flange for the connection of the front bumper, and when the bracket has a flange for the connection to the bodywork of the motor vehicle. Thereby, the bracket bridges areas of the fender which are spaced apart from one another. This results in a particularly high stability of the fender. In addition, the bracket reduces the fender's assembly tolerances in the area pointing in the driving direction.

According to another advantageous embodiment of the invention, the bracket can be manufactured particularly cost-effectively when the bracket is formed as one piece.

The fender according to an embodiment of the invention is reliably supported with respect to vertical load when the mounting flange has a horizontal section for mounting to the bodywork.

It contributes to the further increase of the strength and to the improvement of the assembly tolerance of the fender when the horizontal section of the mounting flange is arranged parallel to a water channel provided for mounting to the bodywork. By means of this configuration, a design with a headlight that is brought particularly close to the windshield does not result in a reduction of the stability of the connection of the fender to adjacent areas of the bodywork of the motor vehicle. This configuration contributes to an improvement of the fitting accuracy for a subsequently mounted headlight and to an increase of the stability of the headlight aperture.

It contributes to the reduction of the manufacturing cost of the fender when the mounting flange is manufactured as one piece with an angled edge of the exterior shell of the fender. The manufacturing as one piece is preferably generated by bending the lug on an edge of the fender. Furthermore, hereby, the fender has a particularly high stability in the area of the headlight.

It contributes to the further simplification of the mounting of the fender to the bodywork of the motor vehicle when the mounting flange has a receptacle for applying an assembly gage of the fender. Due to the front position of the receptacle for the fender assembly, the geometry of the bodywork-side receiving point and the receiving points of the left and right fender at the assembly gage is simplified. These receiving points form a particularly large triangle, whereby the assembly tolerances and gap dimensions can be reduced.

It contributes to a further increase of the stability of the fender when the flange of the bracket for the connection to the bodywork of the motor vehicle is arranged on a leg that is angled with respect to the front flange for the connection of the bumper, and to the horizontal section of the mounting flange in the headlight aperture. Furthermore, the angled leg allows a simple determination of the assembly direction of the fender at the bodywork of the motor vehicle. During the assembly, the bracket, which is pre-mounted on the bodywork, can still be displaced in vertical direction. This displaceability can be used to position the bracket by means of the assembly gage in vertical direction with respect to the zero position of the fender. Thereby, the tolerances during the assembly of the bumper and the headlight can easily be adjusted. The final screwing of the bracket is ultimately carried out during the assembly of the fender.

According to another advantageous embodiment of the invention, the bracket is capable to support particularly high forces when the mounting flange and the front flange for the connection of the bumper are oriented perpendicular to one another.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background and summary or the following detailed description.

Figure 1:
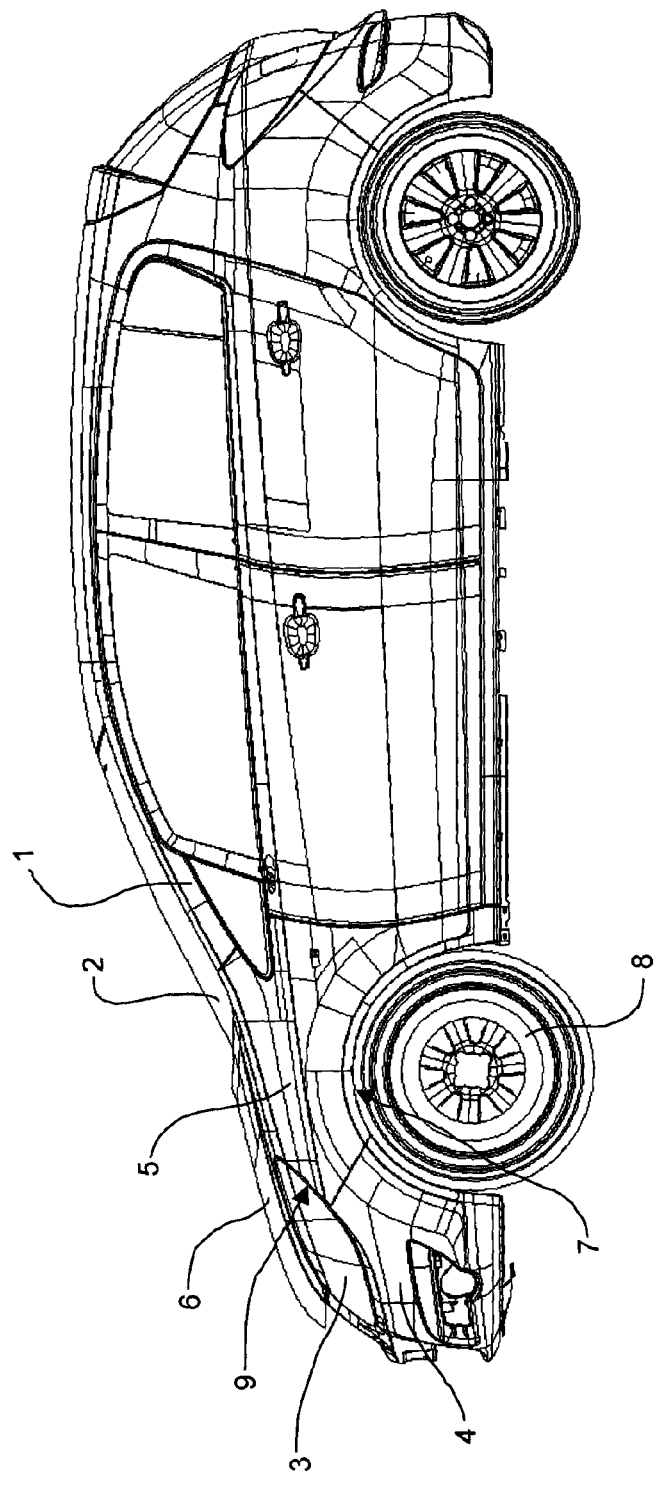
FIG. 1 shows a side view of a motor vehicle with a fender according to an embodiment of the invention.

FIG. 1 shows a motor vehicle with a front A-pillar 1, a windshield 2, with front headlights 3, and a bumper 4 pointing in the driving direction. Between the bumper 4 and the A-pillar 1, a fender 5 is arranged. Furthermore, the motor vehicle has a front hood 6. The fender 5 has a wheel recess 7 for a front wheel 8 of the motor vehicle and a headlight aperture 9 for the front headlight 3 and is mounted to a bodywork of a motor vehicle, which bodywork is not illustrated in more detail here.

Figure 2:
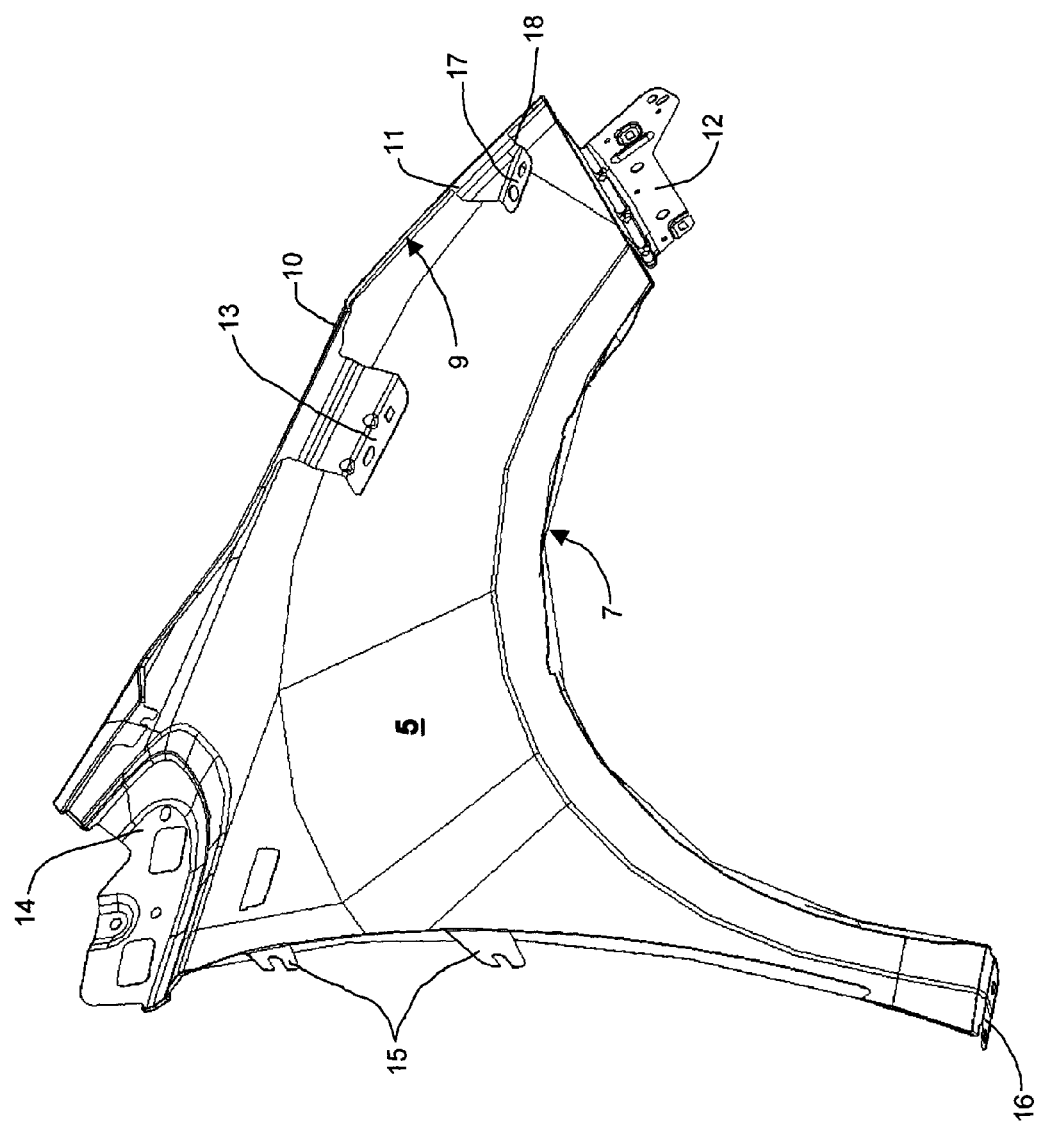
FIG. 2 shows an enlarged perspective view of the fender according to an embodiment of the invention of FIG. 1.

FIG. 2 shows the fender 5 of the motor vehicle in an enlarged perspective illustration, viewed from the wheel recess 7. Here, it is shown that the fender 5, at the headlight aperture 9, has an edge 11 that is angled with respect to an exterior shell 10. At the front end, the fender 5 has a front flange 12 for the connection of the bumper 4 illustrated in FIG. 1. A water channel 13 supporting the front hood 6 illustrated in FIG. 1 serves also for mounting the fender 5 to the bodywork. The water channel 13 is hence arranged between a connection 14 of the fender 5 to A-pillar 1 and the headlight aperture 9. Furthermore, the fender 5 has flanges 15, 16 for its mounting to a not-shown front wall and to a not-shown floor pan of the bodywork of the motor vehicle. The angled edge 11 adjacent to the headlight aperture 9 is manufactured as one piece with a mounting flange 17. The mounting flange 17 has a section 18 which is arranged horizontal and hence arranged parallel to the water channel 13. The horizontal section 18 and the flange 12 for the connection of the bumper 4 are arranged perpendicular to one another.

Figure 3:
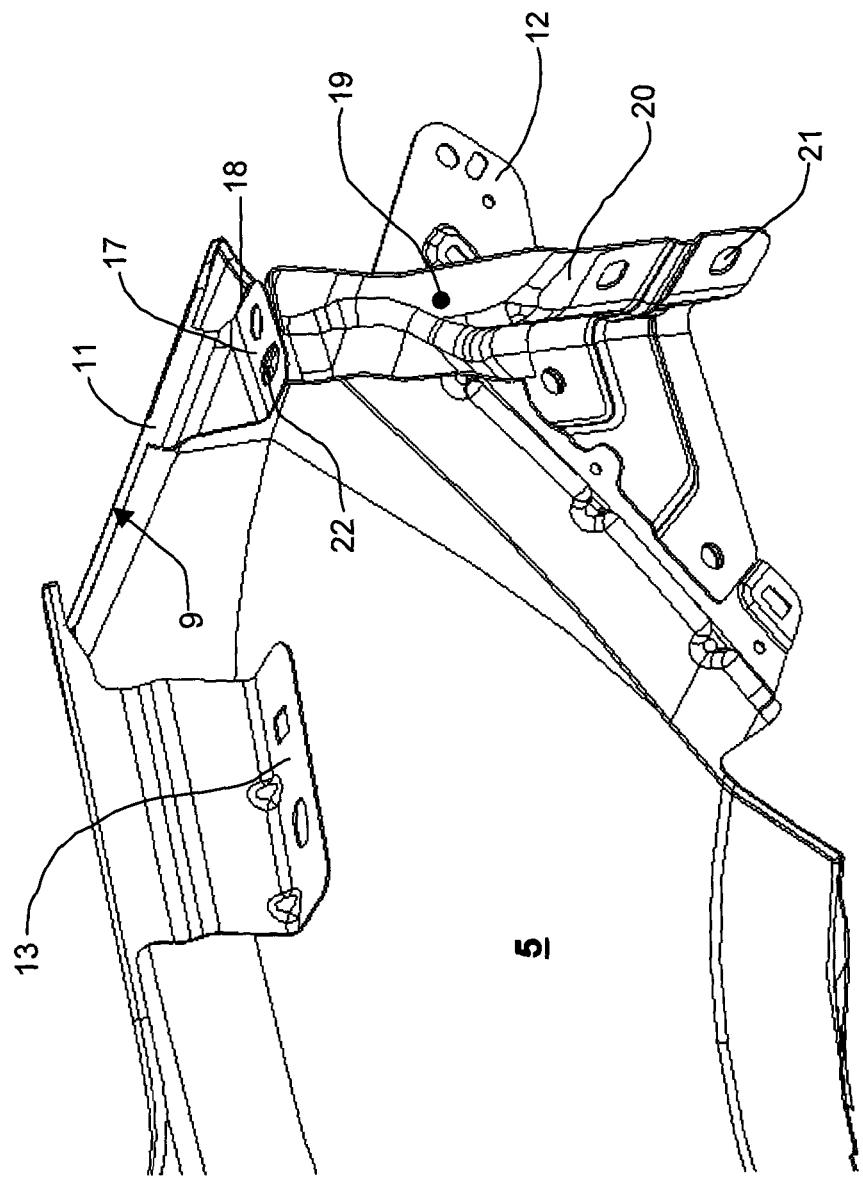
FIG. 3 shows enlarged a fender according to an embodiment of the invention pointing in driving direction of the motor vehicle.

FIG. 3 shows in an enlarged perspective view of the front end of the fender 5 that the mounting flange arranged at the headlight aperture 9 and the flange 12 for the connection of the bumper 4 are connected to one another by means of the bracket 19 formed as one piece. The bracket 19 has a leg 20 which is angled with respect to the flange 12 for the connection of the bumper 4, and to the horizontal section 18 of the mounting flange 17. The angled leg 20 carries a flange 21 for the connection of the fender 5 with the bodywork of the motor vehicle. In addition, the mounting flange 17 has a receptacle 22 formed as a bore hole for a not-illustrated assembly gage for assembling the fender 5 on the motor vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fender for a motor vehicle, comprising:
   a water channel arranged between a head lamp aperture and a connection of an A-pillar for connecting to a bodywork of the motor vehicle;
   a first flange adapted to connect a front bumper pointing in a driving direction;
   a second flange adapted to connect to the bodywork; and
   a mounting flange adapted to connect to the bodywork of the motor vehicle and arranged within the head lamp aperture.

2. The fender according to claim 1, further comprising:
   a bracket adapted to connect the mounting flange within the head lamp aperture to the first flange and adapted to connect to the front bumper; and
   a flange of the bracket adapted to connect to the bodywork of the motor vehicle.

3. The fender according to claim 2, wherein the bracket is formed as one piece.

4. The fender according to claim 1, wherein the mounting flange has a horizontal section for mounting to the bodywork.

5. The fender according to claim 4, wherein the horizontal section of the mounting flange is arranged substantially parallel to the water channel provided for mounting to the bodywork.

6. The fender according to claim 1, wherein the mounting flange is manufactured as one piece with an angled edge of an exterior shell of the fender.

7. The fender according to claim 1, wherein the mounting flange has a receptacle adapted for application in an assembly gage of the fender.

8. The fender according to claim 2, wherein the flange for is arranged on a leg that is angled with respect to the first flange and to a horizontal section of the mounting flange in the head lamp aperture.

9. The fender according to claim 1, wherein the mounting flange and the first flange are oriented substantially perpendicular to one another.

* * * * *